3,354,160
TRI-LOWER ALKYL-SILYL-5-
FLUOROPYRIMIDINES
Robert Duschinsky, Essex Fells, and Thomas Francis
Gabriel, West Paterson, N.J., assignors to Hoffmann-La Roche Inc., Nutley, N.J., a corporation of New Jersey
No Drawing. Filed July 22, 1965, Ser. No. 474,145
4 Claims. (Cl. 260—251)

ABSTRACT OF THE DISCLOSURE

Nucleosides of 5-fluorouracil and 5-fluorocytosine are prepared by reacting 5-fluorouracil or 5-fluorocytosine with hexa-lower alkyl-disilazane to form the corresponding tri-lower alkyl-silyl-5-fluoropyrimidine intermediate, which is subsequently condensed with the appropriate acylated sugar halide and deacylated.

---

This invention relates to novel chemical methods and to novel intermediates useful therein. More particularly, the invention relates to methods for the preparation of nucleosides of 5-fluorouracil and 5-fluorocytosine and to novel pyrimidine intermediates therefor. The nucleosides prepared according to the process of this invention are the $N_1$-ribosyl, $N_1$-2'-deoxyribosyl, $N_1$-glucopyranosyl and $N_1$-arabinofuranosyl derivatives of 5-fluorouracil and 5-fluorocytosine.

The novel process of this invention comprises reacting either 5-fluorouracil or 5-fluorocytosine, preferably an N-acyl derivative of 5-fluorocytosine with hexa-lower alkyl-disilazane to form the corresponding tri-lower alkyl-silyl derivative. The tri-lower alkyl-silyl-5-fluoropyrimidine is then condensed with a halide (preferably chloride or bromide) of the appropriate sugar wherein the hydroxyl groups are blocked with a removable alkyl or acyl group to form the corresponding blocked nucleoside which is readily deblocked to give the desired nucleoside. The process of this invention can be conveniently traced with respect to the following schematic diagrams wherein the symbol X in Formulas III and VII represents one of the above-referred to sugar moieties in which the hydroxy groups have been blocked by a removable alkyl or acyl group and the symbol Y in Formulas IV and VIII represents the corresponding deblocked sugar moieties. The symbol $R_1$ in Formulas V, VI and VII represents either hydrogen or an alkanoyl or aroyl group and R represents lower alkyl.

(a)

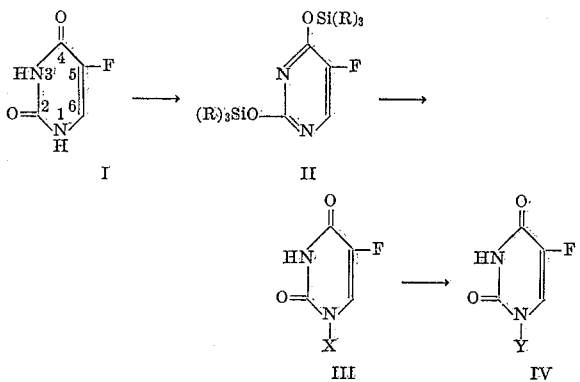

(b)

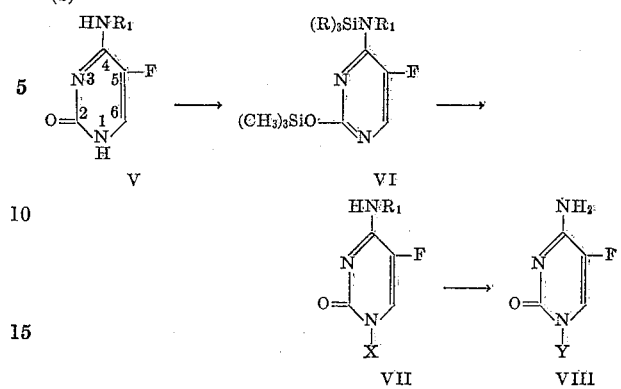

The compounds of Formulas II and VI above are novel and thus constitute a part of this invention. The species of Formulas IV and VIII wherein Y represents a glucopyranosyl group are also novel and these too constitute an important embodiment of this invention.

Those skilled in the art will appreciate that the compounds of Formulas I, III, IV, V, VII and VIII can exist in different tautomeric and anomeric forms, all of which are included in the invention. Thus, the carbonyl groups of Formulas I, III, IV, V, VII and VIII can also be shown in the enolized form.

The term "lower alkyl" as used in this application connotes both straight and branched chain hydrocarbons havings 1 to 7 carbon atoms.

With reference to the schematic diagram (a) above and considering in greater detail the process of the invention leading to derivatives of 5-fluorouracil as shown thereby, the reaction I→II can be readily effected by simply reacting 5-fluorouracil with a hexa-lower alkyl-disilazane, e.g. hexamethyldisilazane, hexaethyldisilazane, etc. The reaction is preferably carried out at an elevated temperature suitably at the reflux temperature of the reaction mixture though lower temperatures could also be employed, i.e., room temperature or below. The reaction can be carried out either in an inert organic solvent such as dioxane, toluene and the like or in the absence of any solvent. Referring now to schematic diagram (b) the reaction V→VI is effected by reacting cytosine or a cytosine in which the exocyclic amino group is protected by an easily removable alkyl or acyl group with hexa-lower alkyl-disilazane. Suitable functional groups which figure as easily removable alkyl or acyl groups are, for example, lower alkanoyl, halogeno-lower alkanoyl, benzoyl and benzoyl in which one or more of the hydrogens have been replaced by a halogen, lower alkyl, lower alkoxy, nitro or carboxyl group. The reaction can be conveniently effected between about room temperature and the boiling point of the reaction mixture and can be carried out in an inert organic solvent or in the absence of any solvent.

Condensation of the novel intermediates of this invention, i.e., compounds of Formulas II and VI, with a blocked sugar halide, i.e., steps II→III and VI→VII above, can be suitably carried out by simply heating the mixture of the two reactants to a temperature of between about room temperature and the boiling point of the reaction mixture. The reaction can be conducted in the absence of a solvent though, if desired, there can be employed any inert solvent medium such as hydrocarbons, for example, toluene, benzene, etc.; ethers, such as dioxane, etc. The blocked sugar halides suitable for the process of this invention are the halides of ribose, deoxyribose, arabinose and glucose wherein the hydroxyl groups are blocked by easily removable alkyl or acyl groups such as lower alkanoyl groups, e.g., acetyl, propionyl, isopropionyl, etc.; halogeno or polyhalogeno lower alkanoyl groups, e.g., trifluoroacetyl, trichloroacetyl, etc.; benzyl, carboalkoxy, carbobenzyloxy, benzoyl and benzoyl bearing one or more substituents on the phenyl ring which can be either halogen, lower alkyl, nitro, lower alkoxy or carboxyl. Blocked sugar halides wherein the blocking group is a substituted benzoyl with the substituent in the para position are preferred. Illustrative sugar halides answering the above description are, for example, 1-(2,3,5-tri-lower alkanoyl-O-ribofuranosyl)chloride,
1-(3,5-di-O-aroyl-2-deoxyribofuranosyl)bromide,
1-(2,3,5-tri-O-benzoyl-D)-arabinofuranosyl bromide,
1-(2,3,4,6-tetra-O-lower alkanoyl)-D-glucopyranosyl chloride,
1-(2,3,4,6-tetra-O-aroyl)-D-glucopyranosyl bromide and the like.

The reaction product obtained from the condensation step is usually a mixture of anomeric forms. The mixture can be subjected to the next step of deblocking the sugar moiety without separation of the anomeric forms, if desired. Alternatively, the two anomers can be separated by techniques known to the art such as fractional crystallization and/or chromatography and the separated anomers can be individually deblocked.

Referring again to the diagrams (a) and (b), the final steps, III→IV and VII→VIII, can be accomplished by methods which are known per se, for example, the acyl groups can be removed by treating compounds III and VII with alcoholic ammonia. Alternatively, the acyl groups can be removed by reacting with an acid, e.g. alcoholic hydrochloric acid or a strong base such as sodium hydroxide or preferably with alkali metal alcoholates, e.g., methanolic sodium methoxide, barium methoxide and the like. The alkyl groups, i.e. the benzyl groups are removed by catalytic hydrogenation.

Referring now in particular to the novel species of Formulas IV and VIII wherein Y represents a glucopyranosyl moiety, an alternative procedure for preparing the intermediates represented by Formulas III and VII is also available. Compounds of Formulas III and VII can be obtained by the reaction of 5-fluorocytosine monomercury or mono-(5-fluorouracilyl)mercury with a blocked sugar halide as above. According to Baker's trans Rule, the alternative procedure via the mercury intermediate gives exclusively the α-anomer in the case of the arabinofuranosyl derivatives, whereas the process of the present invention via the tri-lower alkyl-silyl intermediate provides a method of obtaining both the α- and the β-anomers. The compounds of Formula VIII wherein Y is arabinofuranosyl have also been prepared by an alternative method; however, such method, as well as the 5-fluorocytosine arabinosides which have not been previously disclosed, do not constitute part of this invention. The end products prepared by the process of this invention are pharmaceutically useful compounds. In particular, they are useful as anti-bacterial and anti-viral agents. The invention can be more fully understood from the following examples which are illustrative but not limitative thereof. All temperatures are in degrees centigrade and all melting points are corrected.

Example 1

A suspension of 65 g. (0.5 mole) of 5-fluorouracil in 250 ml. (1.18 moles) of hexamethyldisilazane was refluxed for three hours when a clear solution resulted. Distillation at atmospheric pressure removed some material boiling at 85–96°. The residue was then distilled at 114–116.5°/14 mm. to give 2,4-bis(trimethylsilyloxy)-5-fluoropyrimidine.

Example 2

To a suspension of 7.56 g. (0.0195 mole) of 3,5-di-O-p-toluoyl-2-deoxyribofuranosyl chloride in 40 ml. of dry toluene, was added 5 ml. (5.330 g., 0.0195 mole) of 2,4-bis(trimethylsilyloxy)-5-fluoropyrimidine. Nitrogen was passed over the reaction mixture in order to convey the released trimethylsilyl chloride into a wash bottle containing aqueous alcoholic silver nitrate solution. The formation of silver chloride permitted the course of the reaction to be followed. The mixture was heated to reflux temperature for 1½ hours, when 81 percent of the theoretical amount of silver chloride was isolated. The suspension was chilled in ice, the solid removed by filtration and washed with toluene and petroleum ether. Thus, crude ditoluoyl-5-fluorodeoxyuridine, melting at 209–216°, was obtained. According to the rotation $[\alpha]_D^{26} = -30°$ (c.= 0.72 percent pyridine) this is a mixture of about 75 percent β- and 25 percent α-isomer.

Recrystallization from 45 ml. of acetic acid and washing of the crystallized product with ether gave the pure β-isomer $[\alpha]_D$ −18.8°, M.P. 230–231°. The combined acetic acid filtrate and ether washing deposited the α-isomer, M.P. 205–207°.

Example 3

A suspension of 172 g. (0.327 mole) of tri-O-benzoyl-α-D-arabinofuranosyl bromide in 113.5 g. (0.414 mole) of 2,4-bis(trimethylsilyloxy)-5-fluoropyrimidine was heated in an oil bath under nitrogen atmosphere. The temperature was maintained between 75° and 130° C. for a total of 5 hours. After being cooled to room temperature, the nearly solid mixture was slurried with 800 ml. of benzene and filtered. The crude tri-O-benzoyl-β-D-arabinofuranosyl-5-fluorouracil thus obtained melted at 210–212° C. Recrystallization from n-butylacetate raised the melting point to 219–220° C. $[\alpha]_D^{25} = +74.7°$ (1 percent in methylene chloride).

Example 4

A suspension of 5.75 g. (0.010 mole) of tri-O-benzoyl-β-D-arabinofuranosyl-5-fluorouracil in 70 ml. of 0.143 normal methanolic sodium methoxide was heated to reflux for 2½ hours. Complete solution occurred after approximately 5 minutes. The solution was cooled to room temperature and sufficient methanolic HCl added to make the mixture acid to litmus paper. It was then evaporated in vacuo to a syrup which was partitioned between 50 ml. of water and 50 ml. of ether. After the aqueous phase had been washed with 3 x 30 ml. of ether, it was evaporated in vacuo to a syrup which was taken up in 50 ml. of acetone. The resulting suspension was filtered to remove the insoluble material (NaCl). Evaporation of the filtrate in vauo gave a white solid which crystallized upon treatment with 8 ml. of boiling ethanol.

After cooling at −10°, the crystals were filtered and washed with ethanol and ether to give 5-fluorouracil-β-D-arabinoside melting at 182–183°. $[\alpha]_D^{25} = +123°$ (0.5 percent in water).

Example 5

A mixture of 8 ml. (8.55 g., 0.031 mole) of 2,4-bis(trimethylsilyloxy)-5-fluoropyrimidine and 4.11 g. (0.01 mole) of 1-(2,3,4,6-tetra-O-acetyl-D-glucopyranosyl)bromide was heated in an oil bath of 140–160° under a nitrogen stream. A clear solution resulted after 15 minutes and trimethylsilyl bromide evolution practically stopped after 4 hours. After cooling, 40 ml. of benzene was added. The mixture, upon standing at 4° for 60 hours, deposited a greenish-brown solid which was removed by filtration and discarded. The filtrate gave upon addition of 15 ml. of methanol crystals, M.P. 280–282° which were identified as recovered 5-fluorouracil. Further addition of 20 ml. of methanol and evaporation to a syrup, which was taken up with 25 ml. hot chloroform, produced a second crystallization of 5-fluorouracil, which was removed by filtration. The filtrate was evaporated to a brown glass which was dissolved in 10 ml. methanol. Upon standing, the solution deposited crystals of 1-(2',3',4',6'-tetra-O-acetyl-β-D-glucopyranosyl)-5-fluorouracil which were filtered and washed with methanol, ether and petroleum ether, M.P. 150–151°. [α]_D = +12° (c.=0.4 percent ethyl acetate).

*Example 6*

A suspension of 9.17 g. (0.020 mole) of d,l-5-fluorouracilyl mercury in 300 ml. of toluene was dried by azeotropic distillation. After the collection of 50 ml. of distillate, the suspension was cooled to 60° C. and 16.44 g. (0.020 mole) of 1-(2,3,4,6-tetra-O-acetyl-α-D-glucopyranosyl)bromide were added. The mixture was heated to boiling and the distillate was collected until it was clear. After refluxing for 1 hour 10 minutes, the remaining solid was removed by filtration of the hot suspension and washed well with benzene. The combined filtrate and washings were cooled and diluted with 750 ml. of petroleum ether (B.P. 30–60°). The resulting precipitate was collected by filtration, washed with petroleum ether, dried in vacuo and extracted with 200 ml. of chloroform. After removal of the insoluble residue, the chloroform extract was washed with 3×50 ml. of 30 percent potassium iodide solution containing 0.5 percent sodium bicarbonate and then with 2×100 ml. of water. The chloroform phase was dried with sodium sulfate and evaporated to a syrup which crystallized upon dissolution in 15 ml. of hot methanol, M.P. 149–150° C. [α]_D^{25} = +12.5° (c.=0.2 in ethyl acetate).

*Example 7*

To a suspension of 0.46 g. of tetra-acetylglucoside (1 mmole) in 5 ml. of methanol was added 1.35 ml. of 1.84 N NaOCH_3 (2.3 mmole) whereupon almost clear solution resulted, which subsequently became cloudy. After letting the reaction mixture stand at 4° for 16 hours it was neutralized with ethanolic hydrochloric acid, insoluble material was removed by filtration. The filtrate was evaporated, the residue was suspended in 15 ml. of acetone, the suspension was refluxed for ½ hour and the insoluble (A) filtered off. The filtrate was again evaporated, the residue treated with 5 ml. boiling acetone and mixed with 20 ml. petroleum ether. A precipitate (B) was separated by filtration. Fractions (A) and (B) which proved to be identical according to chromatography were combined and dissolved in 2 ml. of water. The solution contained 5140 optical density units taken at the maximum of 266–267 mμ in 0.1 N HCl. The solution was brought to pH 11.3 by addition of NaOH and put on a Dowex 1–X4 acetate column 1×20 cm. Elution was performed with 0.1 N acetic acid and 4150 O.D. units were recovered in 105 ml. of lyophilization furnished a glassy white solid. Descending paper chromatography using 86 percent butanol and 14 percent water gave one spot (R_f 0.122)

$$\lambda_{max.}^{0.1\,N\,HCl} = 268 \text{ m}\mu \ (\epsilon = 8210)$$

*Example 8*

A suspension of 49.4 g. (0.2 mole) of N-toluoyl-5-fluorocytosine in 100 ml. (0.236 mole) of hexamethyldisilazane was refluxed for 40 minutes. A clear solution was obtained. Some volatile material was removed by distillation at 96–113° at atmospheric pressure. Fractional distillation of the residue at 160–183° (most of it at 178°) and 0.8 mm. gave 2-trimethylsilyloxy-4-(N-trimethylsilyl-N-p-toluoyl)amino-5-fluoropyrimidine as a yellowish syrup.

*Example 9*

A mixture of 6.8 g. (0.0174 mole) of 2-trimethylsilyloxy - 4 - (N - trimethylsilyl - N - toluoyl) - amino-5-fluoropyrimidine and 5 g. (0.0093 mole) of tri-O-benzoyl-α-D-arabinofuranosyl bromide was heated at 113– 118° C. in a nitrogen atmosphere for 2½ hours. The homogeneous liquid was cooled to room temperature and diluted with 40 ml. of warm benzene. Addition of 2 ml. of ethanol produced a precipitate. The suspension was stirred for ½ hour, filtered and the solid washed well with benzene. The combined filtrate and washings were concentrated in vacuo to a yellow solid. This crude anomeric mixture of α- and β-tri-O-benzoyl-N-toluoyl-D-arabinofuranosyl-5-fluorocytosine melted at 87–95° C.

*Example 10*

A suspension of 1 g. of crude N-toluoyl-1-(2',3',5'-tri-O-benzoylarabinofuranosyl)-5-fluorocytosine in 25 ml. of 8 N methanolic NH_3 was stirred at room temperature for 24 hours. The resultant solution gave a yellow gum upon evaporation in vacuo which was partitioned between 20 ml. of chloroform and 20 ml. of water. The aqueous phase was washed with 3×20 ml. of chloroform and then set aside for ion-exchange chromatography.

*Example 11*

To a suspension of 1 g. of crude N-toluoyl-1-(2',3',5'-tri-O-benzoylarabinofuranosyl)-5-fluorocytosine in 25 ml. of methanol there was added 1.4 ml. of 4.11 N methanolic sodium methoxide solution. After being stirred overnight, the resultant solution was adjusted to pH 7 with methanolic hydrogen chloride and evaporated in vacuo. The residue was washed with acetone, then taken up in 10 ml. of absolute ethanol and the insoluble material removed by filtration. The filtrate gave a yellow solid upon evaporation. This residue was dissolved in the aqueous solution obtained in the ammonolysis previously described. After being washed with 25 ml. of ether, the aqueous solution was made acid to congo red test paper with acetic acid and fractionated on a Dowex 50–X8 (NH_4 form) ion-exchange column, 1.1×24 cm. Fractions of 15 ml. volume were collected. Elution with water was carried out from fraction 1 to 120, and a gradient elution with 0.2 N NH_4OH into an equal volume of water started at fraction 121. Fractions 174–186, which showed the proper ultraviolet absorption spectrum, were combined, concentrated to a small volume and made acid with formic acid.

The acidic solution was then fractionated on a Dowex 50–X8 (NH_4 form) ion-exchange column 1.1×15 cm. using water as the elutant. Fifteen ml. fractions were collected. Fractions 2 to 10 were combined and lyophilized to 0.25 g. of glassy material. The U.V. spectrum showed a $$\lambda_{max.}^{0.1\,N\,HCl} = 290 \text{ m}\mu$$

E_max=33/mg., [α]_D^{25} = +30° (0.5 percent in methanol), representing a mixture of 60 percent β- and 40 percent α-anomers.

Fractions 11–43 were concentrated to approximately 100 ml. and then lyophilized to a white highly electrostatic powder, $$\lambda_{max.}^{0.1\,N\,HCl} = 292 \text{ m}\mu \ (1856 \text{ O. D. units})$$

corresponding to 158 mμ moles of 5-fluorocytosine arabinoside. [α]_D^{25} = −156.4° (2 percent in MeOH), representing mostly α-anomer.

What is claimed is:
1. A compound of the formula

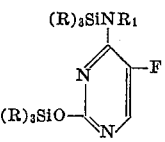

wherein R is lower alkyl and R_1 represents hydrogen, lower alkanoyl, halogeno-lower alkanoyl, benzoyl or benzoyl in which one or more of the hydrogens has been replaced by halogen, lower alkyl, lower alkoxy, nitro or carboxyl.

2. 2-trimethylsilyloxy-4-(N-trimethylsilyl-N-p-toluoyl)amino-5-fluoropyrimidine.
3. A compound of the formula
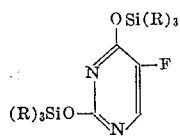
wherein R is lower alkyl.
4. 2,4-bis(trimethylsilyloxy)-5-fluoropyrimidine.
References Cited
UNITED STATES PATENTS
| 3,155,646 | 11/1964 | Hunter | 260—211.5 |
| 3,183,226 | 5/1965 | Hunter | 260—211.5 |
| 3,208,997 | 9/1965 | Iwai et al. | 260—211.5 |
OTHER REFERENCES
Naito et al. "Chem. Abst." vol. 60, 1964, pp. 15975(h).
LEWIS GOTTS, *Primary Examiner.*
J. R. BROWN, *Assistant Examiner.*